3,364,158
METHOD OF PRODUCING LIGNIN-REINFORCED RUBBER, USING ALKYLENE DIAMINES
Thomas Raymond Griffith, Ottawa, Ontario, Donald Wesley MacGregor, Greenbriar, Brantford, Ontario, and Ernest C. Horswill, Ottawa, Ontario, Canada, assignors, by mesne assignments, to Domtar Limited, Montreal, Quebec, Canada
No Drawing. Continuation-in-part of application Ser. No. 128,395, Aug. 1, 1961. This application Mar. 19, 1964, Ser. No. 353,231
13 Claims. (Cl. 260—17.5)

ABSTRACT OF THE DISCLOSURE

In producing a vulcanizate from a rubber-ligin coprecipitate, the rate of cure can be controlled without the usual difficulty of a highly accelerated lignin-rubber coprecipitate tending to pre-vulcanize during factory processing if the lignin-rubber coprecipitate is first treated with an alkylene diamine, such as N,N,N',N'-tetrakis(2-hydroxypropyl) ethylene diamine.

---

This invention relates to an improvement in the method of producing vulcanizate from a rubber-lignin coprecipitate or masterbatch made from a mixture of rubber latex and an aqueous alkaline solution of lignin. More particularly, it relates to a method whereby the rate of cure can be controlled without the usual difficulty of the highly accelerated lignin-rubber coprecipitate tending to pre-vulcanize during factory processing.

This application is a continuation-in-part of U.S. application Ser. No. 128,395 filed Aug. 1, 1961, now abandoned.

During recent years much interest has been attached to the use of lignin as a reinforcing agent for rubber. In particular, interest has centered about the coprecipitate of rubber and lignin obtained by precipitation from a mixture of rubber latex and a solution of lignin in aqueous alkali. The chief difficulty with lignin has been its delaying effect on vulcanization so that strong acceleration as well as strong activation has been necessary. The insoluble lignin precipitate is an acid and it is believed that this is a major reason for the slowing down of vulcanization, since acidity is a frequent cause of delayed vulcanization.

Hydrogen sulfide is produced during vulcanization by reaction of sulphur with rubber or other hydrocarbon present, and it is generally considered to be a necessary intermediate in the vulcanization reaction. It has been shown, however, that hydrogen sulfide in excess will slow down or even practically stop vulcanization. Thus, it is necessary to control the concentration of hydrogen sulfide if a satisfactory vulcanization rate is to be obtained. This control is currently achieved by the use of rubber formulations which are predominantly basic or at least close to neutral. Zinc oxide is always present since it can precipitate hydrogen sulfide in a basic or non-acid environment, and is used as a buffer to control the hydrogen sulfide concentration.

However, since zinc oxide can precipitate hydrogen sulfide only in a basic environment it is ineffective as a buffer on the hydrogen sulfide concentration when the medium is acid as is the case with lignin. It has, therefore, been necessary to find buffers which will precipitate hydrogen sulfide in an acid medium.

A highly satisfactory tire has been produced by the use of lead oxide as a buffer for lignin reinforced rubber. In a road test carried out in Texas under controlled conditions over a pavement, gravel and a cross-country course, a tread produced from a lignin reinforced rubber buffered with lead oxide compared favourably with the commercial carbon black control, and actually showed 15% better abrasion resistance than the control. However, in order to achieve a satisfactory rate of cure an ultra-accelerator, such as copper dimethyl dithiocarbamate, was necessary as well as the lead oxide and both of these additives have the tendency of causing the rubber to prevulcanize during factory processing.

We have now discovered that if the lignin-rubber masterbatch is first treated with an alkylene diamine of the general formula

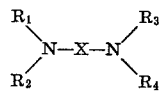

wherein X represents an alkylene group having 2–6 carbon atoms and at least one of $R_1$, $R_2$, $R_3$ and $R_4$ is selected from the group consisting of a hydroxyalkyl group having 2–6 carbon atoms and an alkylamino group having 2–6 carbon atoms, the remaining members of the group $R_1$, $R_2$, $R_3$ and $R_4$ being selected from the group consisting of hydrogen, a hydroxyalkyl group having 2–6 carbon atoms, and an alkyl amino group having a 2–6 carbon atoms, said alkylene diamine having a vapour pressure less than 760 mm. at 225° C. (referred to hereinafter as "the additive"), the thus treated masterbatch can be vulcanized in the same manner as a carbon black reinforced masterbatch without the necessity of resorting to ultra accelerators such as the dithio carbamates and other equally powerful accelerators.

Among suitable alkylene diamines according to the invention there may be mentioned, for example, N,N,N',N'-tetrakis (2-hydroxypropyl) ethylene diamine, N,N'-bis(2-hydroxyethyl) ethylenediamine, N,N,N'-tris (2-hydroxypropyl) - N' - (2 - hydroxyethyl) ethylenediamine, N,N,N',N'-tetrakis(2 - hydroxyethyl) ethylenediamine and 1-(2-hydroxyethylamino)-2-(2 - aminopropylamino) propane.

The rubber latex used in the present invention may be natural rubber latex, or a conjugated diene polymer synthetic rubber latex, or mixtures of any of the same. Such conjugated diene polymer synthetic rubber latex may be an aqueous emulsion polymerizate of a 1,3-butadiene, such as 1,3-butadiene, 2-methyl butadiene, piperylene, 2,3-dimethyl butadiene, or a mixture of such 1,3-butadienes. The conjugated diene polymer synthetic rubber latex may also be an aqueous emulsion polymerizate of a mixture of one or more of such 1,3-butadiene with one or more other polymerizable compounds which are capable of forming rubbery copolymers with 1,3-butadiene, for example, up to 70% of such mixture of one or more compounds which contain a single $CH_2=CH<$ group where at least one of the disconnected valences it attached to an electro-negative group, that is, a group which substantially increases the electrical dissymmetry or polar characteristics of the molecule. Examples of such monoolefins containing a terminal methylene group which are copolymerizable with butadienes-1,3 are styrene, vinyl toluene, vinyl naphthalene, alpha methyl styrene, parachloro styrene, dichlorostyrene, alpha methyl dichlorostyrene, acrylic acid, methyl acrylate, ethyl acrylate, methyl methacrylate, acrylonitrile, methacrylonitrile, methacrylamide, methyl vinyl ether, methyl vinyl ketone, vinylidene chloride, vinyl carbazole, vinyl pyridines such as 2-vinyl pyridene and alkyl vinyl pyridines such as 2-methyl-5-vinyl pyridine.

The lignin used in this invention is preferably the lignin commonly recovered by precipitation from its soluble sodium salt in the black liquor in the kraft sulfate process of wood pulping by acidification of the waste liquor. The lignin is readily soluble in an aqueous alkali to form alkaline lignate solution, from which the lignin will precipitate on acidification.

The relative proportions of lignin and rubber in the masterbatch can vary widely. Generally the proportion of lignin will range from 25 to 100 parts by weight per 100 of rubber but the amount of lignin can be even lower. For tire tread stocks, we prefer to employ from 30 to 60 parts of lignin per 100 of rubber.

In accordance with this invention, a small amount of the additive is simple mixed into or otherwise suitably uniformly incorporated into a dry lignin-rubber masterbatch at an elevated temperature. This mixing is preferably carried out in a mixer such as the well-known Banbury mixer and the temperature must be at least 220° F., preferably in the range of 240° F. to 400° F. We found that no effect was obtained when the additive was incorporated on a cold mill. The mixing need not be prolonged any more than is necessary to produce a homogeneous stock. The additive is highly effective in producing the desired improvements, and as little as about 1 part by weight of additive in 100 parts of rubber is sufficient to produce noticeable improvement. However, we generally prefer to use somewhat more additive than this, say about 5 parts and increased benefits may be noted with increased quantities of additive, up to about 10 to 15 parts, or even more.

The following examples will serve to illustrate the practice of the invention in greater detail. The additive used in these examples is supplied by Wyandotte Chemical Company under their trademark "Quadrol." The lignin that we have used is the commercial material known as "Indulin A" which is a commercial pine wood alkali lignin produced by the West Virginia Pulp and Paper Co. This material is a purified pine wood lignin derived from paper-pulp sulfate black liquor. Throughout the examples the quantities of ingredients are expressed as parts by weight per hundred parts rubber (phr.).

EXAMPLE 1

The temperature of a Banbury mixer was raised with steam to 240° F. and a lignin-SBR masterbatch containing 45 phr. lignin was added. After one minute of mixing 5 phr. of "Quadrol" was added and the mixing continued for one and one half minutes. After the "Quadrol" was thoroughly mixed with the masterbatch, a softener, stearic acid and zinc oxide were added in usual manner. The total mixing time was about 5 minutes and the dump temperature was in the range of 380 to 400° F., accelerator and sulfur were then added on a mixing mill and the complete formulation was as follows:

| | |
|---|---|
| SBR (butadiene-styrene synthetic rubber) | 100.0 |
| Lignin | 45.0 |
| "Quadrol" [N,N,N',N'-tetrakis (2-hydroxypropyl) ethylene diamine] | 5.0 |
| "Paraflux" (asphaltic hydrocarbon softener) | 5.0 |
| Stearic acid | 2.0 |
| Zinc oxide | 3.0 |
| "Santocure" MOR (N-oxydiethylene benzothiazyl sulfenamide) | 1.1 |
| DPG (diphenyl guanidine) | 0.2 |
| Sulfur | 1.8 |

The above formulation showed freedom from excessive gel formation in the Banbury and freedom from scorch during factory extrusions.

Samples of this stock were cured under pressure at 287° F. for different lengths of time and the physical characteristics of the cured rubber examined for the various curing times. The physical properties of the cured product were as follows:

| Press cure at 287° F., min. | Modulus at 300% | Tensile strength, p.s.i. | Elongation at break, percent | Shore hardness |
|---|---|---|---|---|
| 10 | 245 | 440 | 620 | 39 |
| 20 | 995 | 2,690 | 570 | 52 |
| 30 | 1,285 | 3,245 | 540 | 54 |
| 40 | 1,350 | 3,210 | 520 | 55 |
| 60 | 1,500 | 3,225 | 490 | 56 |
| 80 | 1,500 | 3,085 | 480 | 56 |

DE MATTIA FLEXOMETER

| Press cure at 287° F., min. | Kilocycles to 0.5 in. cut | Shore hardness |
|---|---|---|
| 40 | 100 | 55 |
| 60 | 92 | 55 |
| 80 | 80 | 55 |

GOODRICH FLEXOMETER

| Press cure at 287° F. | Heat build-up Δ °F. | Compression deflection, percent | Compression set, percent | Shore hardness |
|---|---|---|---|---|
| 60 | 50 | 14.4 | 2.3 | 55 |
| 80 | 50 | 14.7 | 2.0 | 55 |

EXAMPLE 2

In order to study the effect of different concentrations of additive on the curing rate of the rubber stock and physical properties of the vulcanizate thus produced the following formulations were prepared.

| Stock | A | B | C | D | E | F | G | H |
|---|---|---|---|---|---|---|---|---|
| SBR | 100.0 | 100.0 | 100.0 | 100.0 | 100.0 | 100.0 | 100.0 | 100.0 |
| Lignin | 45.0 | 45.0 | 45.0 | 45.0 | 45.0 | 45.0 | 45.0 | 45.0 |
| "Quadrol" | 3 | 4 | 5 | 6 | 7 | 8 | 9 | 10 |
| "Paraflux" | 4.25 | 4.25 | 4.25 | 3.75 | 3.25 | 2.75 | 2.25 | 1.75 |
| "Circosol" 2XH[1] | 3.75 | 3.75 | 3.75 | 3.25 | 2.75 | 2.25 | 1.75 | 1.25 |
| "Neozone" D[2] | 1 | 1 | 1 | 1 | 1 | 1 | 1 | 1 |
| "Sunproof Improved"[3] | 1.5 | 1.5 | 1.5 | 1.5 | 1.5 | 1.5 | 1.5 | 1.5 |
| Zinc oxide | 5 | 5 | 5 | 5 | 5 | 5 | 5 | 5 |
| Stearic acid | 2 | 2 | 2 | 2 | 2 | 2 | 2 | 2 |
| "Santocure" N.S. | 1.6 | 1.6 | 1.6 | 1.6 | 1.6 | 1.6 | 1.6 | 1.6 |
| DPG | 0.15 | 0.15 | 0.15 | 0.15 | 0.15 | 0.15 | 0.15 | 0.15 |
| Sulfur | 1.8 | 1.8 | 1.8 | 1.8 | 1.8 | 1.8 | 1.8 | 1.8 |

[1] "Circosol" 2XH = Naphthenic type oil softener.
[2] "Neozone" D = Antioxidant (N-phenyl-beta-naphthylamine).
[3] "Sunproof Improved" = Anti-weathering agent of waxy materials.

On testing the above stocks for scorching tendency the following results were obtained:

MOONEY SCORCH TIME
[Large Rotor at 212° F.]

| Stock | A | B | C | D | E | F | G | H |
|---|---|---|---|---|---|---|---|---|
| Time (min.) | 75 | 73 | 75 | 76 | 72 | 75 | 80 | 82 |

After the eight stocks were cured under pressure at 287° F. for forty minutes, their physical properties were determined to be as follows:

| | A | B | C | D | E | F | G | H |
|---|---|---|---|---|---|---|---|---|
| Modulus at 300% | 910 | 1,260 | 1,230 | 1,495 | 1,170 | 1,425 | 1,350 | 1,540 |
| Tensile strength | 3,000 | 2,760 | 3,295 | 3,235 | 3,450 | 3,300 | 3,230 | 3,520 |
| Elongation at break, percent | 575 | 480 | 510 | 490 | 550 | 510 | 520 | 480 |
| Shore hardness | 50 | 51 | 51 | 51 | 50 | 50 | 52 | 55 |

A stock similar to the above was also prepared which contained no "Quadrol" and with it no cure was obtained at 40 minutes.

EXAMPLE 3

A typical carbon black rubber stock was also prepared having the following composition:

SBR (butadiene-styrene synthetic rubber) _____ 100.0
Carbon black _____ 50.0
"Paraflux" (asphaltic hydrocarbon softener) _____ 10.0
Stearic acid _____ 2.0
Zinc oxide _____ 3.0
"Santocure" (N-cyclohexyl-2-benzothiazole-sulfenamide) _____ 0.9
DPG (diphenyl guanidine) _____ 0.2
Sulfur _____ 1.9

This stock was then cured at 287° F. for 40 minutes and had the following physical properties:

Tensile strength, p.s.i. _____ 2,400
Elongation at break, percent _____ 555
Modulus at 300% elongation, p.s.i. _____ 1,250
Shore hardness _____ 60
De Mattia flexing, kilocycles to produce a 0.5" crack _____ 140
Goodrich heat build-up _____ 65

EXAMPLE 4

Following the mixing procedure of Example 1, a rubber formulation was prepared having the following composition:

SBR (Butadiene-styrene synthetic rubber) _____ 100
Lignin _____ 45
N,N'-bis(2-hydroxyethyl)ethylenediamine _____ 5.00
"Paraflux" (asphaltic hydrocarbon softener) _____ 4.25
"Circosol" 2×H(naphthenic type oil softener) ___ 3.75
"Sunproof Improved" (anti-weathering agent) ____ 1.50
Stearic acid _____ 2.00
"Neozone" D(N-phenyl-beta-naphthylamine) _____ 1.00
Zinc oxide _____ 5.00
"Santocure" NS (N-cyclohexyl-2-benzothiazole sulfenamide) _____ 1.60
Diphenylguanidine _____ 0.15
Sulfur _____ 1.80

This stock was then cured at 287° F. for 40 minutes and had the following physical properties:

Modulus at 300% elongation _____p.s.i__ 1300
Tensile strength _____p.s.i__ 3000
Elongation at break _____percent__ 530
Shore hardness _____ 50
Dimattia flexing, kilocycles to produce a 0.5 inch crack _____ 60

EXAMPLE 5

Following the mixing procedure of Example 1, a rubber formulation was prepared having the following composition:

SBR (Butadiene-styrene synthetic rubber) _____ 100
Lignin _____ 45
N,N,N'-tris(2-hydroxypropyl) - N' - (2-hydroxyethyl)ethylene diamine _____ 5.00
"Paraflux" (asphaltic hydrocarbon softener) _____ 5.00
Stearic Acid _____ 2.00
Zinc oxide _____ 3.00
"Santocure" MOR(N-oxydiethylene benzothiazyl sulfenamide) _____ 1.10
Diphenylguanidine _____ 0.20
Sulfur _____ 1.80

This stock was then cured at 287° F. for 40 minutes and had the following physical properties:

Modulus at 300% elongation _____p.s.i__ 1125
Tensile strength _____p.s.i__ 2840
Elongation at break _____percent__ 550
Shore hardness _____ 50
Dimattia flexing, kilocycles to produce a 0.5 inch crack _____ 70

Formulations have also been prepared using as additives N,N,N',N'-tetrakis(2-hydroxyethyl)ethylenediamine and 1-(2-hydroxyethylamino)-2-(2-aminopropylamino)propane. Fully satisfactory cured products were obtained with both of these additives, the first additive giving a cured product having a tensile strength of 3560 p.s.i. and a flex-cracking test result of 57 kilocycles and the second additive yielding a cured product having a tensile strength of 3750 p.s.i.

The lignin-reinforced rubber of this invention has also been tested for use in tires. A lignin reinforced SBR rubber modified with the additive of this invention was used to produce an all-synthetic 11:00" x 20" cross-country military pattern tire. Only a small proportion of approximately 5% of natural rubber was retained in the carcass formulation, owing to the uncertainty in the present stage of the development as to the ability of successive synthetic rubber plies to adhere properly together in the tire building operation. In a road test carried out in Texas under controlled conditions over a pavement, gravel and cross-country course, this tread compared favourably with a commercial carbon black control.

The principal advantage of the additive of this invention resides in its ability to neutralize the delaying effect of lignin on vulcanization while at the same time avoiding the inherent difficulty of strong activators such as lead oxide and ultraaccelerators such as copper dimethyl dithiocarbamate which tend to cause prevulcanization during factory processing. In addition, the additive is well adapted to heat treatment because of its low volatility, with the result that there is very little loss of additive at the high mixing temperatures employed. Another advantage of the additive is excellent plasticizing action which greatly facilitates the mixing process. Only one pass through the Banbury mixer is necessary when the additive is used whereas without the additive two or more are needed in order to obtain a stock which will extrude smoothly.

Thus, by the use of the additive of this invention it is now possible to produce lignin-reinforced rubber on the same equipment with the same compounding ingredients and operating conditions as are normally used with rubber reinforced with carbon black. As can be seen from the above examples, the rubber obtained by simple substitution of lignin for carbon black, using the additive of this invention, is fully competitive in physical properties with a regular carbon black rubber. In fact the lignin reinforced rubber of this invention is generally superior to carbon black reinforced rubber in modulus at 300% tensile strength and heat build-up.

The embodiments of the invention in which an exclusive property or privilege is claimed are defined as follows:

1. The process which comprises heating at a temperature of at least 220° F. a mixture of a lignin-rubber coprecipitate and an additive consisting of an alkylene diamine of the general formula

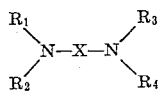

wherein X represents an alkylene group having 2 to 6 carbon atoms and at least one of $R_1$, $R_2$, $R_3$ and $R_4$ is selected from the group consisting of a hydroxyalkyl group having 2 to 6 carbon atoms and an alkylamino group having 2 to 6 carbon atoms, the remaining members of the group $R_1$, $R_2$, $R_3$ and $R_4$ being selected from the group consisting of hydrogen, a hydroxyalkyl group having 2 to 6 carbon atoms and an alkylamino group having 2 to 6 carbon atoms, said alkylene diamine having a vapor pressure less than 760 mm. at 225° C.

2. The process as claimed in claim 1 wherein the coprecipitate is heated before the additive is mixed in.

3. The process as claimed in claim 1 wherein the rubber is selected from the group consisting of natural rubber and synthetic rubber polymers of material selected from the group consisting of butadienes-1,3 and mixtures of butadienes-1,3 with compounds which contain a $CH_2=C<$ group and are copolymerizable with butadienes-1,3.

4. The process which comprises heating at a temperature of at least 220° F. a mixture of a lignin-rubber coprecipitate and an additive consisting of an alkylene diamine selected from the group consisting of N,N,N',N'-tetrakis(2-hydroxypropyl)ethylene diamine, N,N'-bis(2-hydroxyethyl)ethylenediamine, N,N,N'-tris(2 - hydroxypropyl)-N' - (2 - hydroxyethyl)ethylenediamine, N,N,N',N'-tetrakis(2-hydroxyethyl)ethylenediamine and 1-(2-hydroxyethylamino)-2-(2-aminopropylamino)propane.

5. The process which comprises heating to a temperature of about 240° F. to about 400° F., a lignin-rubber coprecipitate of a mixture of a rubber latex and an alkaline aqueous solution of lignin, the lignin being in amount from about 25 to about 100 parts per 100 parts of rubber in the lignin-rubber coprecipitate, and thereafter mixing into the thus treated lignin-rubber coprecipitate about 1 to about 15 parts of N,N,N',N'-tetrakis(2-hydroxypropyl) ethylene diamine per 100 parts of said rubber, said rubber, being selected from the group consisting of natural rubber and synthetic rubber polymers of material selected from the group consisting of butadiene-1,3 and mixtures of butadienes-1,3 with compounds which contain a $CH_2=C<$ group and are copolymerizable with butadienes-1,3.

6. The process which comprises mixing at a temperature of about 240° F. to about 400° F. a lignin-rubber coprecipitate of a mixture of about 25 to about 100 parts lignin per 100 parts rubber and about 1 to about 15 parts of N,N,N',N' - tetrakis(2 - hydroxypropyl)ethylene diamine per 100 parts of rubber, and vulcanizing the product obtained, said rubber being selected from the group consisting of natural rubber and synthetic rubber polymers of material selected from the group consisting of butadiene-1,3 and mixtures of butadienes-1,3 with compounds which contain a $CH_2=C<$ group and are copolymerizable with butadienes-1,3.

7. A rubber stock comprising a rubber and lignin and an additive consisting of an alkylene diamine of the general formula

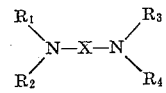

wherein X represents an alkylene group having 2 to 6 carbon atoms and at least one of $R_1$, $R_2$, $R_3$ and $R_4$ is selected from the group consisting of a hydroxyalkyl group having 2 to 6 carbon atoms and an alkylamino group having 2 to 6 carbon atoms, the remaining members of the group $R_1$, $R_2$, $R_3$ and $R_4$ being selected from the group consisting of hydrogen, a hydroxyalkyl group having 2 to 6 carbon atoms and an alkylamino group having 2 to 6 carbon atoms, said alkylene diamine having a vapor pressure less than 760 mm. at 225° C., said rubber and lignin having been coprecipitated from a mixture of rubber latex and an alkaline aqueous solution of lignin, and said additive having been mixed into the lignin-rubber coprecipitate at a temperature of at least 220° F., said rubber being selected from the group consisting of natural rubber and synthetic rubber polymers of material selected from the group consisting of butadienes-1,3 and mixtures of butadienes-1,3 with compounds which contain a $CH_2=C<$ group and are copolymerizable with butadienes-1,3.

8. A rubber stock comprising 100 parts of a rubber, from about 25 to about 100 parts of lignin, and from about 1 to about 15 parts of an additive consisting of an alkylene diamine of the general formula

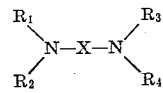

wherein X represents an alkylene group having 2 to 6 carbon atoms and at least one of $R_1$, $R_2$, $R_3$ and $R_4$ is selected from the group consisting of a hydroxyalkyl group having 2 to 6 carbon atoms and an alkylamino group having 2 to 6 carbon atoms, the remaining members of the group $R_1$, $R_2$, $R_3$, and $R_4$ being selected from the group consisting of hydrogen, a hydroxyalkyl group having 2 to 6 carbon atoms and an alkylamino group having 2 to 6 carbon atoms, said alkylene diamine having a vapor pressure less than 760 mm. at 225° C., said rubber and lignin having been coprecipitated from a mixture of rubber latex and an alkaline aqueous solution of lignin, and said additive having been mixed into the lignin-rubber coprecipitate at a temperature of at least 220° F., said rubber being selected from the group consisting of natural rubber and synthetic rubber polymers of material selected from the group consisting of butadienes-1,3 and mixtures of butadienes-1,3 with compounds which contain a $CH_2=C<$ group and are copolymerizable with butadienes-1,3.

9. A rubber stock as claimed in claim 8 wherein the additive is a compound selected from the group consisting of N,N,N',N'-tetrakis(2-hydroxypropyl)ethylene diamine, N,N'-bis(2-hydroxyethyl)ethylenediamine, N,N,N'-tris(2-hydroxypropyl) - N'-(2-hydroxyethyl)ethylenediamine, N,N,N',N'-tetrakis(2 - hydroxyethyl)ethylenediamine and 1-(2-hydroxyethylamino)-2-(2-aminopropylamino)propane.

10. A rubber stock comprising 100 parts of a rubber, from about 25 to about 100 parts of lignin, and from about 4 to about 10 parts of N,N,N',N'-tetrakis (2-hydroxypropyl)ethylene diamine, said rubber and lignin having been coprecipitated from a mixture of rubber latex and an alkaline aqueous solution of lignin, and said N,N,N',N'-tetrakis(2 - hydroxypropyl)ethylene diamine having been mixed into the lignin-rubber coprecipitate at a temperature of about 240° F. to about 400° F., said rubber being selected from the group consisting of natural rubber and synthetic rubber polymers of material selected from the group consisting of butadienes-1,3 and mixtures of butadienes-1,3 with compounds which contain a $CH_2=C<$ group and are copolymerizable with butadienes-1,3.

11. A product comprising a vulcanized rubber composition comprising a rubber and lignin and an additive consisting of an alkylene diamine of the general formula

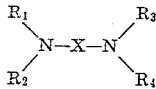

wherein X represents an alkylene group having 2 to 6 carbon atoms and at least one of $R_1$, $R_2$, $R_3$ and $R_4$ is selected from the group consisting of a hydroxyalkyl group having 2 to 6 carbon atoms and an alkylamino group having 2 to 6 carbon atoms, the remaining members of the group $R_1$, $R_2$, $R_3$ and $R_4$ being selected from the group consisting of hydrogen, a hydroxyalkyl group having 2 to 6 carbon atoms and an alkylamino group having 2 to 6 carbon atoms, said alkylene diamine having a vapor pressure less than 760 mm. at 225° C., said rubber and lignin having been coprecipitated from a mixture of rubber latex and an alkaline aqueous solution of lignin, and said additive having been mixed into the lignin-rubber coprecipitate at a temperature of at least 220° F., said rubber being selected from the group consisting of natural rubber and synthetic rubber polymers of material selected from the group consisting of butadienes-1,3 and mixtures of butadienes-1,3 with compounds which contain a $CH_2=C<$ group and are copolymerizable with butadienes-1,3.

12. A product comprising a vulcanized rubber composition comprising a rubber and lignin and an additive consisting of an alkylene diamine of the general formula

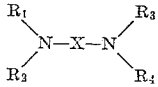

wherein X represents an alkylene group having 2 to 6 carbon atoms and at least one of $R_1$, $R_2$, $R_3$ and $R_4$ is selected from the group consisting of a hydroxyalkyl group having 2 to 6 carbon atoms and an alkylamino group having 2 to 6 carbon atoms, the remaining members of the group $R_1$, $R_2$, $R_3$ and $R_4$ being selected from the group consisting of hydrogen, a hydroxyalkyl group having 2 to 6 carbon atoms and an alkylamino group having 2 to 6 carbon atoms, said alkylene diamine having a vapor pressure less than 760 mm. at 225° C., the lignin being in quantity not more than about 100 parts per 100 parts of a rubber, and the additive being in quantity at least about 4 parts per 100 parts of rubber, said rubber and lignin having been coprecipitated from a mixture of rubber latex and an alkaline aqueous solution of lignin, and said additive having been mixed into the lignin-rubber coprecipitate at a temperature of at least 220° F., said rubber being selected from the group consisting of natural rubber and synthetic rubber polymers of material selected from the group consisting of butadienes-1,3 and mixtures of butadienes-1,3 with compounds which contain a $CH_2=C<$ group and are copolymerizable with butadienes-1,3.

13. A product comprising a vulcanized rubber composition comprising 100 parts of a rubber from about 25 to about 100 parts of lignin and from about 1 to about 15 parts of N,N,N′,N′-tetrakis(2-hydroxypropyl)ethylene diamine, said rubber and lignin having been coprecipitated from a mixture of rubber latex and an alkaline aqueous solution of lignin, and said N,N,N′,N′-tetrakis(2-hydroxypropyl)ethylene diamine having been mixed into the lignin-rubber coprecipitate at a temperature of about 240° F. to about 400° F., said rubber being selected from the group consisting of natural rubber and synthetic rubber polymers of material selected from the group consisting of butadienes-1,3 and mixtures of butadienes-1,3 with compounds which contain a $CH_2=C<$ group and are copolymerizable with butadienes-1,3.

References Cited
UNITED STATES PATENTS

| | | | |
|---|---|---|---|
| 2,676,931 | 4/1954 | Pollack | 260—17.5 |
| 2,697,118 | 12/1954 | Lunsted et al. | 260—31.6 |
| 2,890,183 | 6/1959 | Haxo et al. | 260—17.5 |
| 3,296,158 | 1/1967 | Dimitri | 260—17.5 |

WILLIAM H. SHORT, *Primary Examiner.*

J. NORRIS, *Assistant Examiner.*